US007689006B2

(12) United States Patent
Govindaraju et al.

(10) Patent No.: US 7,689,006 B2
(45) Date of Patent: Mar. 30, 2010

(54) BIOMETRIC CONVOLUTION USING MULTIPLE BIOMETRICS

(75) Inventors: Venu Govindaraju, Williamsville, NY (US); Viraj Chavan, Amherst, NY (US); Sharat Chikkerur, Amherst, NY (US)

(73) Assignee: The Research Foundation of State University of NY, Amherst, NY (US)

( * ) Notice: Subject to any disclaimer, the term of this patent is extended or adjusted under 35 U.S.C. 154(b) by 992 days.

(21) Appl. No.: 11/208,390

(22) Filed: Aug. 19, 2005

(65) Prior Publication Data
US 2006/0078171 A1    Apr. 13, 2006

Related U.S. Application Data

(60) Provisional application No. 60/603,126, filed on Aug. 20, 2004.

(51) Int. Cl.
*G06K 9/00*    (2006.01)
(52) U.S. Cl. .................. 382/115; 713/116; 713/186
(58) Field of Classification Search ................. 382/115, 382/116; 713/186, 202, 156; 726/18
See application file for complete search history.

(56) References Cited

U.S. PATENT DOCUMENTS

| | | | | |
|---|---|---|---|---|
| 4,993,068 A * | 2/1991 | Piosenka et al. | ............ | 713/186 |
| 5,469,506 A * | 11/1995 | Berson et al. | ................ | 713/186 |
| 5,712,912 A | 1/1998 | Tomko et al. | | |
| 5,987,155 A * | 11/1999 | Dunn et al. | .................. | 382/116 |
| 6,219,794 B1 * | 4/2001 | Soutar et al. | .................. | 726/18 |
| 7,117,370 B2 * | 10/2006 | Khan et al. | ................. | 713/186 |
| 7,274,804 B2 * | 9/2007 | Hamid | ........................ | 382/115 |
| 7,305,550 B2 * | 12/2007 | Oliver et al. | ................ | 713/156 |
| 7,454,624 B2 * | 11/2008 | LaCous | ....................... | 713/186 |
| 2003/0074567 A1 * | 4/2003 | Charbonneau | .............. | 713/186 |
| 2004/0250084 A1 * | 12/2004 | Hamid | ........................ | 713/186 |
| 2004/0255168 A1 * | 12/2004 | Murashita et al. | ........... | 713/202 |

OTHER PUBLICATIONS

Ratha et al., "Enhancing Security and Privacy in Biometrics-based Authentication System", IBM Systems Journal, vol. 40, No. 3, pp. 614-634, 2001.

* cited by examiner

*Primary Examiner*—Daniel G Mariam
*Assistant Examiner*—Aklilu k Woldemariam
(74) *Attorney, Agent, or Firm*—Simpson & Simpson, PLLC

(57) ABSTRACT

Method and apparatus for securing biometric data using multiple biometrics. The method includes the steps of: a) converting a first biometric to an irreversibly altered biometric using a parameterized transform function and b) prior to said conversion parameterizing a non-invertible transform function using at least one additional biometric. The apparatus is an apparatus for converting a first biometric to an irreversibly altered biometric using a parameterized non-invertible transform function comprising a computer containing a program for calculating the irreversibly altered biometric based upon input of a first biometric into the parameterized non-invertible transform function.

7 Claims, 5 Drawing Sheets

ENROLLMENT

VERIFICATION

BIOMETRIC CONVOLUTION USING MULTIPLE BIOMETRICS

CROSS REFERENCE TO RELATED APPLICATIONS

Priority is claimed from U.S. Provisional Application 60/603,126 filed Aug. 20, 2004.

FIELD OF THE INVENTION

This invention relates to biometrics, i.e. the study of measurable biological characteristics, and more particularly relates to establishment of the identity of an individual through his or her physiological or behavioral characteristics.

BACKGROUND OF THE INVENTION

Biometrics presents an accurate method for personal identification and authentication. Biometric data that may be used for identification and authentication include, but are not limited to: facial characteristics; fingerprints; hand geometry; capillary arrangement in the retina; iris ring color; signature; vein arrangement, e.g. on the back of the hand; voice tone, pitch, cadence and frequency patterns; and DNA structure.

There are many applications where a secured identity is useful, e.g. for bank account access; security risk area access, e.g. for defense and secret or potentially dangerous research and development; restricted materials obtainment, e.g. munitions and other weapons and potentially dangerous chemicals and biologic materials; and personal information security, e.g. medical records and information. As an example, in healthcare applications, "health cards" provide a convenient method to expedite billing and claim processing, The information that can be stored includes medical history, insurance provider information and personal details. Identity theft is a serious problem in this area, as well as others, with an increasing number of patients using stolen identities to seek treatment to which they are not entitled causing financial losses to providers. Biometric identification in this area is thus an answer to increasing identity theft.

Although biometrics provides a reliable means of establishing the identity of an individual, it presents its own vulnerabilities. A current disadvantage of biometric identification is that passwords and tokens such as smart cards can be reissued or revoked easily when they are compromised; however, if a biometric template is compromised, it cannot be reissued since any given user has a limited number of biometrics. There are also pertinent issues of privacy when the same biometric is used across several applications or organizations. The major concern is the possible sharing and misuse of biometric databases between organizations and agencies without the user's knowledge. Therefore a method and system is required where the privacy and security of biometric templates is ensured. Further the system should allow re-enrollment and replacement of biometric data if the original template is compromised.

Existing literature in fact suggests "cancelable" or "private" biometrics as a method of securing biometric templates, see e.g. Ratha et al., "Enhancing Security and Privacy in Biometrics-based Authentication System", IBM Systems Journal, Vol. 40, No. 3, pp 614-634, 2001, incorporated by reference as background art. In the Ratha et al. method, the biometric is altered using a deterministic and fixed non-invertible transformation (biometric hashing) before the template is enrolled. However, it requires that transformation parameters be stored along with the template representation. The security of this technique is based upon the assumption that the transformation function and its parameters are secret. But the transformation parameters can be compromised along with the biometric template. Furthermore, if it is required that the representation of the biometric not be changed during the process, the nature of the transformation, function or process is severely constrained. This implies that though the transformation is non-invertible in principle, it may be tractable given enough computational power.

SUMMARY OF THE INVENTION

In accordance with the present invention, a new system and method is provided for ensuring the privacy and security of biometric templates. We have used the term "Biometric Convolution" in conjunction with this new system and new method. In the new system, biometric data is modified using a non-invertible transformation somewhat similar to that of Ratha et al., except that the non-invertible transformation is derived using another biometric of the individual. Due to the non-invertible nature of the conversion, and the fact that the inherently complex nature of the starting biometric is used to create the non-invertible transformation, it is not possible to recover the original biometric data even if the template is compromised. This method also allows for the re-issuance and replacement of the template when required, simply by using another starting biometric or using a different parameter set to create the non-invertible transformation. Another advantage of this method is that the template representation is not changed in the process allowing increased trustworthiness and security of current systems without replacing existing biometric recognition devices or their contained formulas or algorithms. In the method of the present invention, due to the complexity and degrees of freedom in picking the starting biometric data for the non-invertible transformation, and thus in the biometric representation, recovery of the original biometric data is intractable.

Stated more simply, the invention introduces an innovation where the hashing or non-invertible transformation is itself based upon biometric data. The method and system thus presents several advantages over existing methods, in particular: (i) Since the transformation is derived using another biometric, external transformation parameters or the second biometric need not even be stored in the data base making it even more difficult to compromise the templates., and (ii) Where a biometric of one individual closely resembles that of another, false positives in recognition become probable. However, in the case of multiple biometrics, as in the present invention, the chances of multiple biometrics of different individuals being identical is statistically insignificant. Utilizing a personal but statistically independent process to modify the original biometric implies that false accept rates will be reduced, increasing the accuracy of matching.

DETAILED DESCRIPTION OF THE INVENTION

Biometrics such as fingerprint, face, and voice offers means of reliable personal identification. However, unlike passwords and personal identification numbers (PINs) that can be reset or replaced when compromised, when a biometric, such as the image of a face is stolen, it is compromised forever and possibly across multiple systems.

Figure 1:
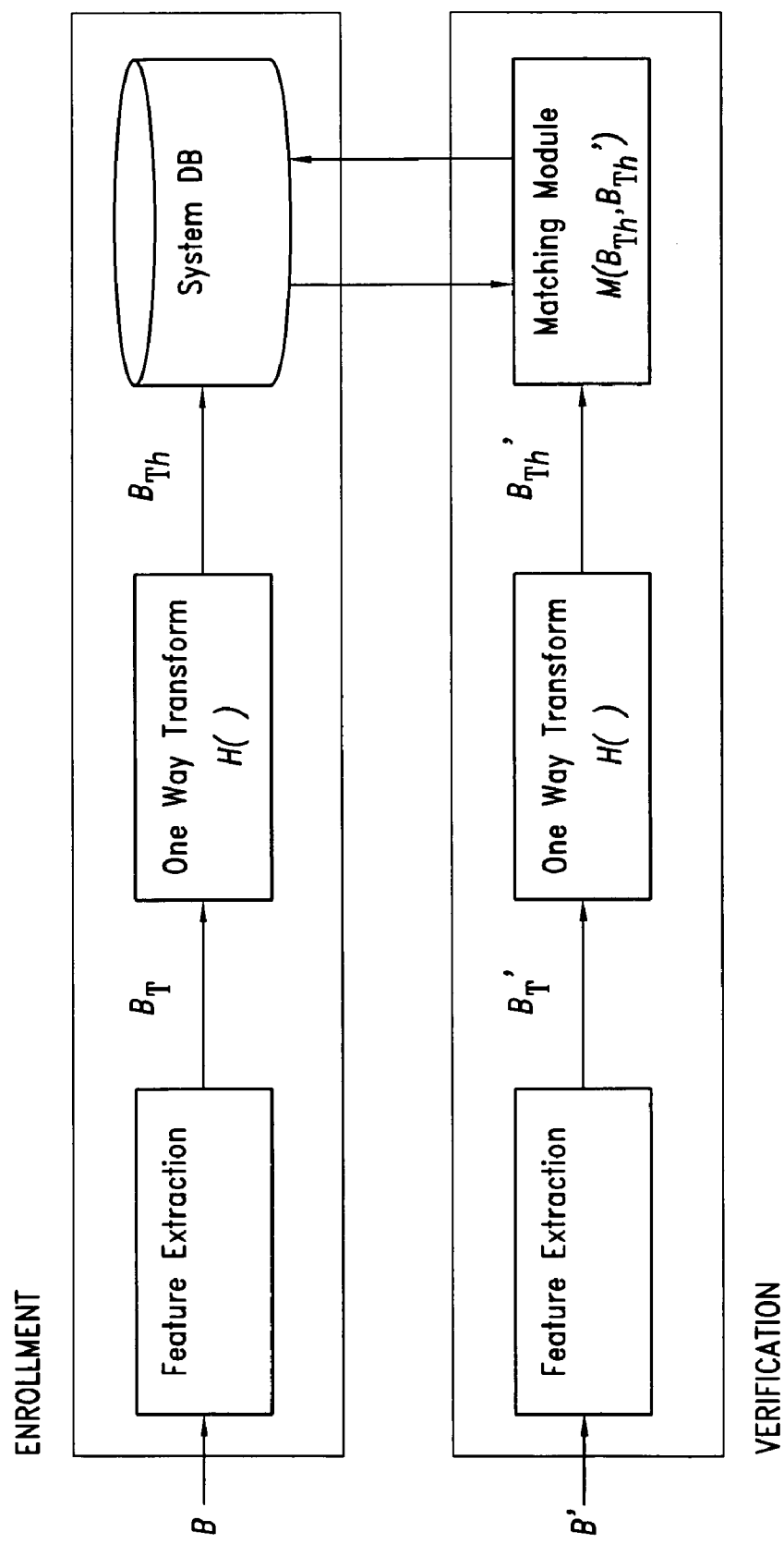
FIG. 1 is a flow diagram showing original feature (biometric) extraction and transformation of a biometric and storage of the resulting transformed biometric in a system data base for enrollment and secondary repeated feature (biometric) extraction and transformation of the same biometric to obtain an identification result for comparison with the stored transformed biometric(verification).

A cancelable biometric template may be obtained by transforming data obtained from the regular features using a non-invertible transform, e.g. as shown in FIG. 1 where biometric data $B_T$ is extracted from a biometric B and submitted to a one-way transform H( ) to obtain transformed data $B_{Th}$ which is stored in a system data base DB. When verification of identity is to be made data $B_T^E$ is obtained by extraction from the same biometric B and again submitted to the same transform function H( ) to obtain comparative transformed information $B_{Th}^E$ which is compared to stored transformed information $B_{Th}$ in a matching module using a comparison function M( ) to compare the two sets of transformed data to determine identity match.

The most commonly used non-invertible transform is a one way hash function. Hashing techniques are frequently used in password based systems. In this approach, the password itself is not stored in the database. Instead, the password is hashed using a transform function H( ) and the resulting obfuscated text is stored. However, in approaches in the prior art a password or other information required for the conversion is stored for use, i.e. all information for using the transform function T( ), e.g. hashing function H( ) is stored in the database and the system is thus more likely susceptible to corruption.

Instead, in accordance with the present invention, the result $H(B_1)$ of a one way transform function T( ), which may be a hashing function H( ) upon data from a first biometric $B_1$ is stored as an ID Code. The transform function T( ) is itself a function of at least one additional biometric $B_2$, usually in addition to a secret supplemental code. During verification, i.e. confirmation of the identity of a particular individual, a second input $B_1'$ is hashed then compared to the previously stored ID Code. In accordance with the present invention, the results of hashing functions are compared (matched) to provide a positive identification. The comparison is done in hashed space, i.e. the hashing results are compared rather than the original biometric data which is not reachable and may not even be stored. Different transform equations may be used in the present invention to protect the original biometric data so long as in the particular application the original biometric data and transform function are the same. Thus even if the stored ID Code is compromised, an individual can be re-enrolled simply by changing the transformation by using a different supplemental code or a different additional biometric to obtain an entirely different ID Code.

Figure 2:
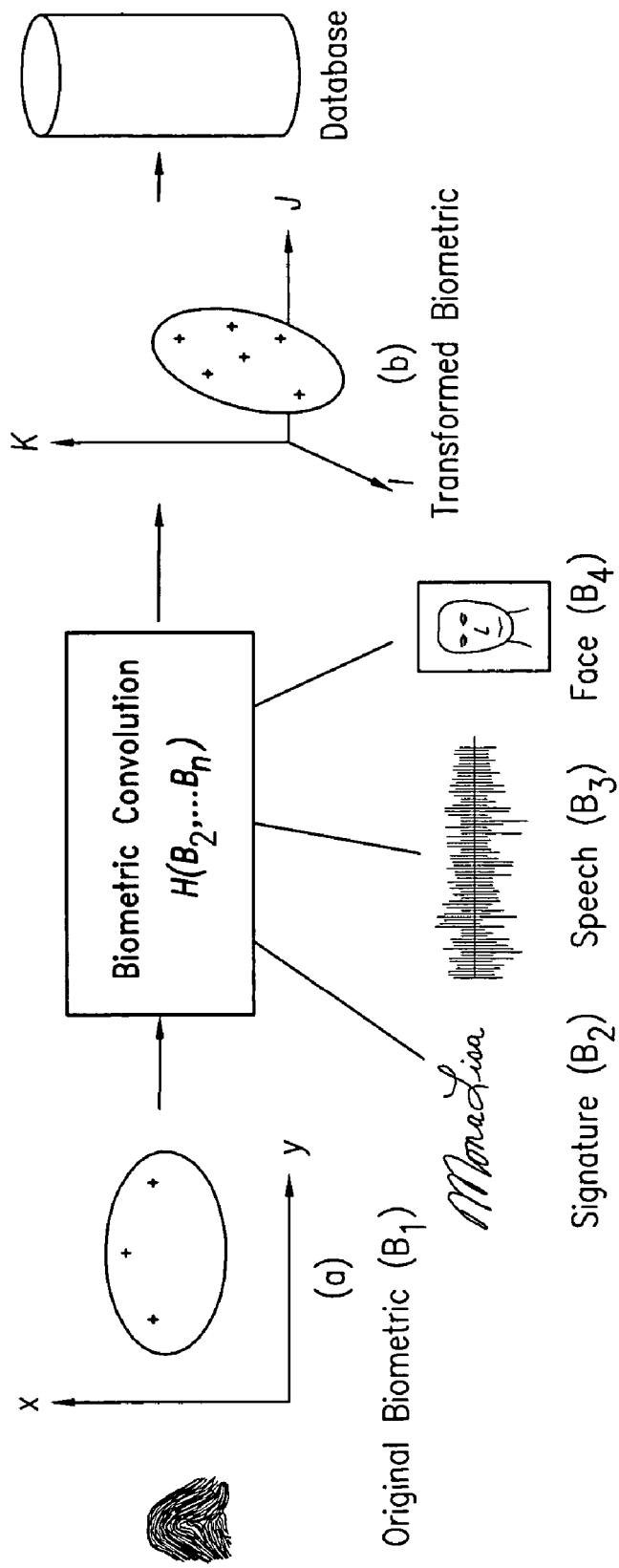
FIG. 2 is a flow diagram showing various biometrics that may be transformed using a biometric convolution based upon another biometric. In this case fingerprint data.
Figure 3:
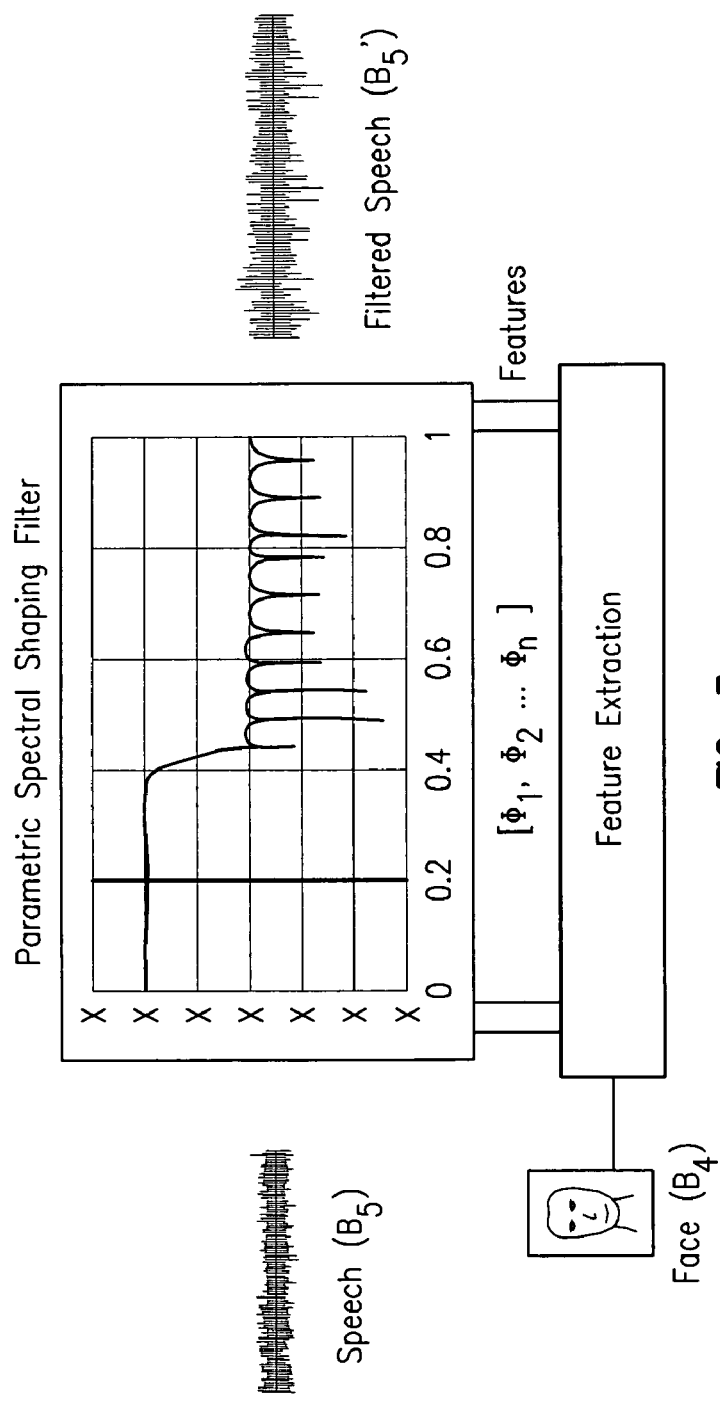
FIG. 3 is a flow diagram showing parameterized hashing function implemented using voice and face biometrics.

In the cancelable biometric method of the invention, as seen in FIG. 2, an original biometric $B_1$ is altered through a non-invertible transformation function $T(B_1)$, e.g. hashing function $H(B_1)$, which hashing function is itself a function of at least one other biometric (as shown in FIG. 2, $H( )=F(B_2, B_3, B_4)$, to yield the transformed biometric $B_1$. The transformation is non-invertible but repeatable. As shown in FIG. 2 the transformation is parametized by the secondary biometrics. The advantage to this approach is that secondary biometrics $\{B_2, B_3, \ldots B_n\}$ need not even be stored in the database making the system very secure. For example, as seen in FIG. 3, face and voice biometric data can be used to construct a new cancelable biometric template. For example speech may be the primary biometric data to be transformed ($B_s$) that has to be secured and the face biometric ($B_f$) may be used to generate the unique transfer function. In such a case, when a user presents himself or herself for authentication, a one way secret transformation function $T(B_f, K)$ is applied to the original voice data ($B_s$) to generate a new biometric template ($B_s$), which henceforth is used in all processing. The key K may be changed to yield different transformation functions allowing re-enrollment users using the same biometrics $B_s$ and $B_f$ or the $B_f$ biometric may be changed to some other biometric. The advantage of K is that the same biometric information may be used for identification. The transformation in this example may be achieved through a parametized digital filter that alters the frequency content of the original voice signal. The parameters may specify gain at different frequencies and will be based on features (e.g. eigenface features) derived from the feature extraction module. Such a system is robust to minor changes in filter parameters due to variation in biometrics $B_s$ and $B_f$ and does not significantly alter the spectral shaping. In order to circumvent such a system, an attacker should have access to a reproduction of the user's biometrics $B_s$ and $B_f$ and should also know the secret key K and details of the transformation function T( ). Circumventing all these measures would be exceedingly difficult making the method and system extremely secure and reliable.

Figure 4:
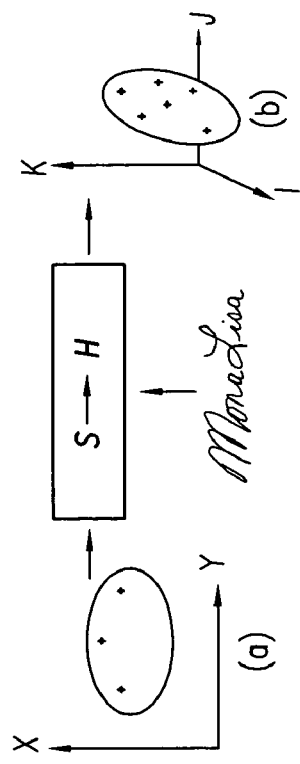
FIG. 4 is a flow diagram showing hashing of original biometric minutiae (e.g. fingerprint data) in Cartesian space into Hash space using a transformation based upon signature biometric data.

As a further example, fingerprints are usually matched using minutiae points. Let the set of N minutiae points be represented as $S\{P_1, P_2, \ldots P_n\}$, FIG. 4 at (a), each of which is usually represented as a tuple $p\{x, y, \theta\}$. Mapping between S (Cartesian space)→H (hashed space), is done using the signature of the individual in the transformation function. Furthermore each subset of points $P_1, P_2, \ldots P_m$ can be used to derive K points in the hash space through linear or non-linear mappings defined by $f_1(P_1, P_2, \ldots P_{m1})$, $f_2(P_1, P_2, \ldots P_{m2}) \ldots f_k(P_1, P_2, \ldots P_{Mk})$, $M_k \leq N$. The matching is then made with the resulting modified minutiae consisting of points ($h_1, h_2, \ldots h_Q$) $Q \leq N$. Unlike signal domain and feature domain distortions, it is to be noted that original features are no longer retained thus it is not possible to recover original features even if the template is compromised.

Figure 5:
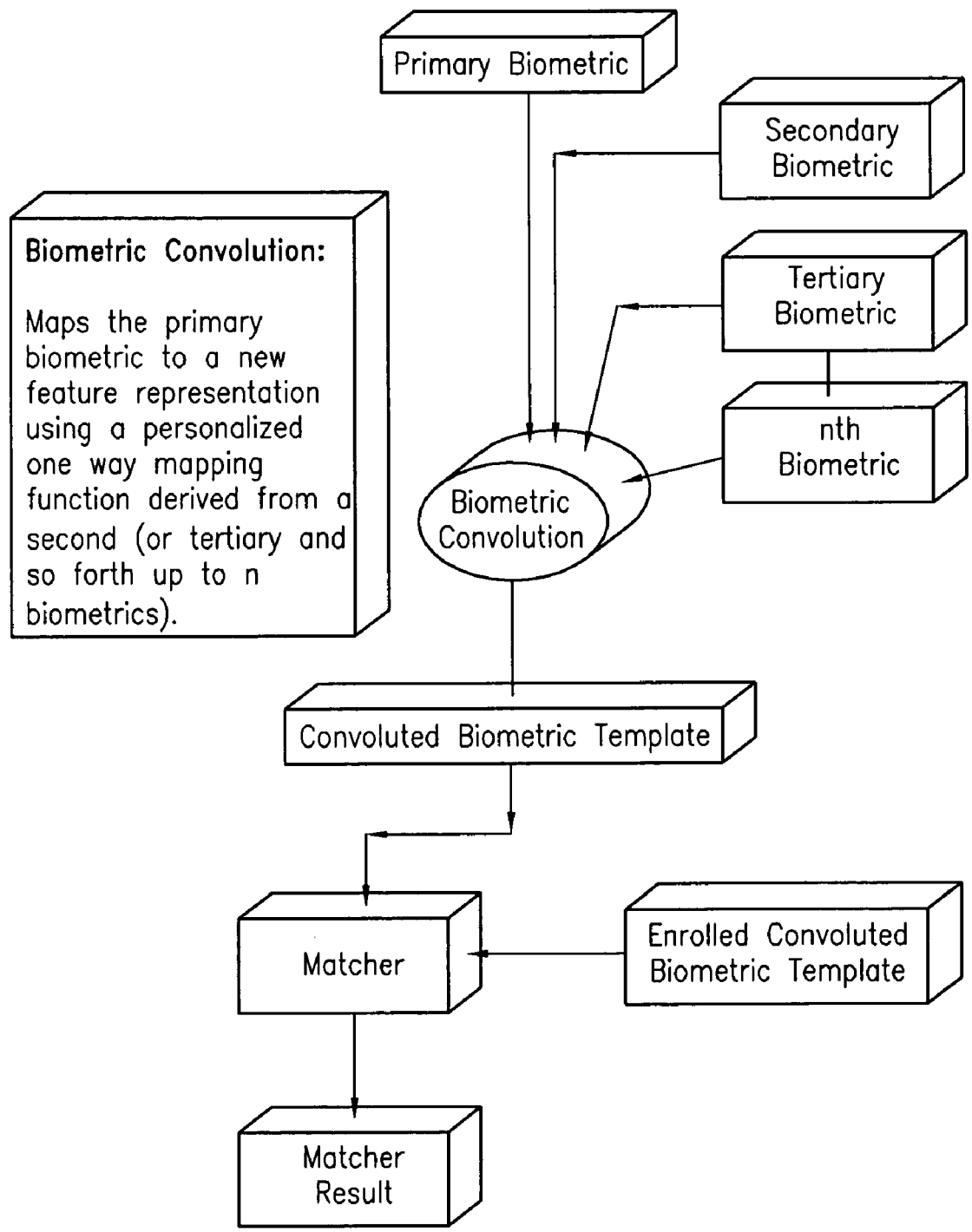
FIG. 5 shows a graphic flow chart for securing biometric data in accordance with the present invention.
Figure 6:
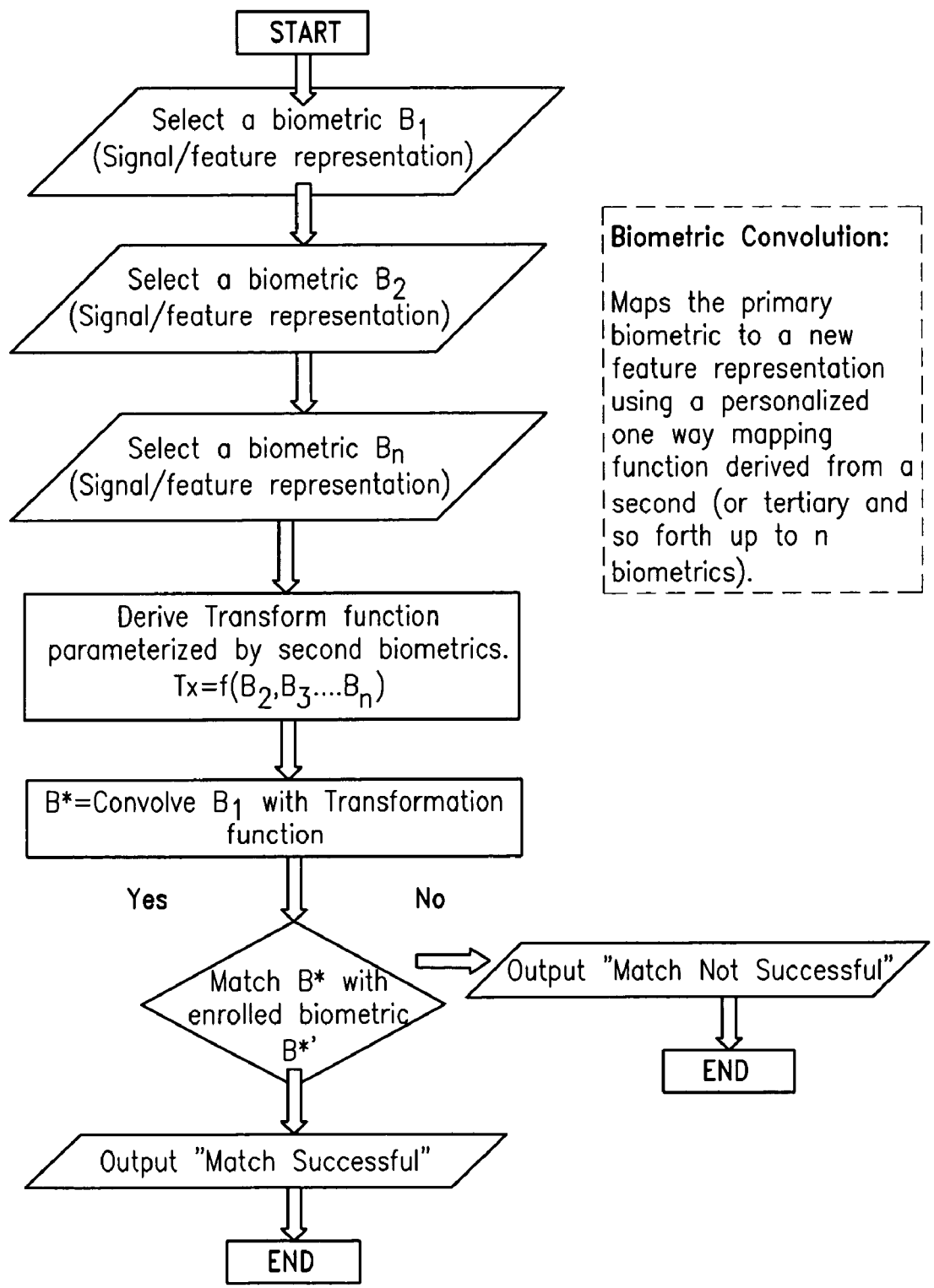
FIG. 6 shows a flow chart for a computer program for use in accordance with the present invention when a computer is used for a biometric convolution in accordance with the present invention.

FIG. 5 shows a graphic flow chart for securing biometric data in accordance with the present invention and FIG. 6 shows a flow chart for a computer program for use in accordance with the present invention.

What is claimed is:

1. An apparatus for converting a first biometric to an irreversibly altered biometric comprising a computer containing a program for calculating the irreversibly altered biometric by: a) Utilizing the program within a computer for parameterizing a non-invertible transform function using at least one biometric; and b) Utilizing the program within the computer for converting an additional biometric to an irreversibly altered biometric using the parameterized non-invertible transform function from step a.

2. The apparatus of claim 1 wherein the apparatus includes a scanner for obtaining information for a first biometric selected from the group consisting of fingerprints, facial features, vein arrangement, capillary arrangement and color and a digitizer for digitizing such information for input into the parameterized non-invertible transform function.

3. The apparatus of claim 1 wherein the first biometric is voice information and the apparatus includes a sensor for obtaining voice information.

4. a method for securing biometric data using multiple biometrics comprising the step of:
   a) Utilizing a program within a computer for parameterizing a non-invertible transform function using at least one biometric; and
   b) utilizing a program within the computer for converting an additional biometric to an irreversibly altered biometric using the parameterized non-invertible transform function from step a.

5. The method of claim 4 wherein a plurality of additional biometrics are used to parameterize the non-invertible transform function.

6. The method of claim 4 wherein the first and additional biometrics are selected from the group consisting of facial characteristics; fingerprints; hand geometry; capillary arrangement in the retina; iris ring color; signature; vein arrangement; voice characteristics; and DNA structure.

7. The method of claim 4 wherein the conversion is accomplished by substituting digitized biometric parameters of the first biometric into the parameterized non-invertible transform function to obtain the irreversibly altered biometric.

* * * * *